US008473428B2

(12) United States Patent
Li et al.

(10) Patent No.: US 8,473,428 B2
(45) Date of Patent: Jun. 25, 2013

(54) GENERATION AND USE OF SPECIFIC PROBABILITY TABLES FOR ARITHMETIC CODING IN DATA COMPRESSION SYSTEMS

(75) Inventors: Xiang Li, Milpitas, CA (US); Congyi Xu, Hefei (CN)

(73) Assignee: Cisco Technology, Inc., San Jose, CA (US)

( * ) Notice: Subject to any disclaimer, the term of this patent is extended or adjusted under 35 U.S.C. 154(b) by 917 days.

(21) Appl. No.: 12/338,213

(22) Filed: Dec. 18, 2008

(65) Prior Publication Data

US 2010/0161523 A1 Jun. 24, 2010

(51) Int. Cl.
*G06F 15/18* (2006.01)

(52) U.S. Cl.
USPC .......................................................... 706/12

(58) Field of Classification Search
USPC .................................. 706/12, 22, 62; 710/68
See application file for complete search history.

(56) References Cited

U.S. PATENT DOCUMENTS

| 5,113,457 | A  | * | 5/1992  | Enomoto et al. ............ 382/238 |
|-----------|----|---|---------|------------------------------------|
| 6,265,997 | B1 | * | 7/2001  | Nomizu ....................... 341/107 |
| 6,556,588 | B2 |   | 4/2003  | Wan et al.                         |
| 6,816,616 | B2 |   | 11/2004 | Teng                               |
| 6,845,102 | B1 |   | 1/2005  | Bendelac et al.                    |
| 6,965,646 | B1 |   | 11/2005 | Firestone                          |
| 7,058,815 | B2 |   | 6/2006  | Morin                              |
| 7,197,070 | B1 |   | 3/2007  | Zhang et al.                       |
| 7,203,372 | B1 |   | 4/2007  | Chen et al.                        |
| 7,218,842 | B1 |   | 5/2007  | Zhang et al.                       |
| 7,394,942 | B2 |   | 7/2008  | Chen et al.                        |
| 7,454,073 | B2 |   | 11/2008 | Chen et al.                        |
| 2002/0054608 | A1 |   | 5/2002  | Wan et al.                      |
| 2002/0147671 | A1 | * | 10/2002 | Sloan et al. ............... 705/36 |
| 2006/0171318 | A1 |   | 8/2006  | Bergamasco et al.               |
| 2006/0232677 | A1 |   | 10/2006 | Butaney et al.                  |
| 2007/0064901 | A1 |   | 3/2007  | Baird et al.                    |
| 2007/0214246 | A1 |   | 9/2007  | Venkataswami et al.             |

OTHER PUBLICATIONS

Marpe et al, "Context-Based Adaptive Binary Arithmetic Coding in the H.264/AVC Video Compression Standard", IEEE Transactions on Circuits and Systems for Video Technology, vol. 13, No. 7, Jul. 2003.*

* cited by examiner

*Primary Examiner* — Alan Chen
*Assistant Examiner* — Ilya Traktovenko

(57) ABSTRACT

In one embodiment, when executing data compression or decompression for a data set, a particular compression category of the data set is determined, and a corresponding probability table specific to the particular compression category of the data set is accessed. Then, one of either arithmetic coding (e.g., an encoder device) or decoding (e.g., a decoder device) may be performed on the data set based on the specific probability table. Specifically, in one or more other embodiments, techniques may statistically generate probability tables specific to particular compression categories.

22 Claims, 9 Drawing Sheets

PROBABILITY TABLE 600

| INDEX 610 | BIT AND LENGTH 615 | PROBABILITY NEXT BIT DIFFERENT 620 | SAME-BIT JUMP 625 | DIFFERENT-BIT JUMP 630 |
|---|---|---|---|---|
| 1 | 0,1 :"0" | 0.571 | 2 | 129 |
| 2 | 0,2 :"00" | 0.500 | 3 | 129 |
| 3 | 0,3 :"000" | 0.667 | 4 | 129 |
| 4 | 0,4 :"0000" | 1.000 | 5 | 129 |
| 5 | 0,5 | 1 | 6 | 129 |
| ⋮ | ⋮ | ⋮ | ⋮ | ⋮ |
| 128 | 0,128 | 1 | X | 129 |
| 129 | 1,1 :"1" | 0.385 | 130 | 1 |
| 130 | 1,2 :"11" | 0.625 | 131 | 1 |
| 131 | 1,3 :"111" | 1.000 | 132 | 1 |
| 132 | 1,4 | 1 | 133 | 1 |
| ⋮ | ⋮ | ⋮ | ⋮ | ⋮ |
| 256 | 1,128 | 1 | X | 1 |

ENTRIES 605

FIG. 6A

PROBABILITY TABLE 600-2

| INDEX 610 | BIT AND LENGTH 615 | PROBABILITY NEXT BIT DIFFERENT 620 | SAME-BIT JUMP 625 | DIFFERENT-BIT JUMP 630 |
|---|---|---|---|---|
| 1 | 0,1 | PA1[1] | 2 | 129 |
| 2 | 0,2 | PA1[2] | 3 | 129 |
| ⋮ | ⋮ | ⋮ | ⋮ | ⋮ |
| 50 | 0,50 | PA1[50] | 51 | 15 |
| ⋮ | ⋮ | ⋮ | ⋮ | ⋮ |
| 100 | 0,100 | PA1[100] | 101 | 50 |
| ⋮ | ⋮ | ⋮ | ⋮ | ⋮ |
| 129 | 1,1 | PB1[1] | 130 | 1 |
| ⋮ | ⋮ | ⋮ | ⋮ | ⋮ |
| 256 | 1,128 | PB1[128] | X | 1 |

ENTRIES 605

"k" JUMPS

FIG. 6B

GENERATION AND USE OF SPECIFIC PROBABILITY TABLES FOR ARITHMETIC CODING IN DATA COMPRESSION SYSTEMS

TECHNICAL FIELD

The present disclosure relates generally to computer networks, and, more particularly, to probability tables used in arithmetic coding in data compression systems.

BACKGROUND

Data compression is a tool for storing and transmitting large amounts of data. For example, the time required to transmit an image, such as a network transmission of a document, is reduced drastically when compression is used to decrease the number of bits required to recreate the image. Many different data compression techniques exist, such as Huffman coding and arithmetic coding. In particular, arithmetic coding is a well-known compression technique that is used in some data coding and compression systems to reduce the number of bits or symbols required for transmission or storage. For instance, an arithmetic encoder receives an input, which includes a sequence of events (e.g., binary events), or symbols, and the encoder encodes the input sequence into a corresponding sequence of bits or bytes. In some cases, fewer data bits are produced at the encoder output than are received at the encoder input, resulting in data compression. An arithmetic decoder may then receive or access the encoded data, and decodes the sequence of encoded data to produce the original data. Compression ratios of events/symbols to information bits being encoded may reach 64:1 or even 128:1, depending on the probability distribution of the events.

Accordingly, arithmetic coding plays an important role in modern compression systems, such as being used in various compression standards (e.g., JPEG 2000, H.264, MPEG, etc.) to efficiently compress bit streams. There are many variances of arithmetic coder (such as the "Q-Coder," "MQ-Coder," "QM-Coder," etc.), which each need to establish one probability model. That is, probability estimation is vital for the success of any arithmetic coding technique. Currently, there are certain well-known probability tables that target all types of data/systems and that are widely used. These "one-for-all" tables are typically based on a generic theoretical probability model, and have achieved acceptable compression ratios across the many different types of data.

BRIEF DESCRIPTION OF THE DRAWINGS

The advantages of the invention may be better understood by referring to the following description in conjunction with the accompanying drawings in which like reference numerals indicate identically or functionally similar elements, of which:

FIGS. 6A-B illustrate example probability tables.

DESCRIPTION OF EXAMPLE EMBODIMENTS

Overview

According to embodiments of the disclosure, when executing data compression or decompression for a data set, a particular compression category of the data set is determined, and a corresponding probability table specific to the particular compression category of the data set is accessed. Then, one of either arithmetic coding (e.g., an encoder device) or decoding (e.g., a decoder device) may be performed on the data set based on the specific probability table.

Specifically, according to one or more embodiments of the disclosure, techniques may be used to statistically generate probability tables specific to particular compression categories. In particular, each table may be generated by sampling a plurality of data sets for a particular compression category, and then determining, statistically based on the sampled data sets, a probability that a next particular bit value will occur based on each length of a previous same-bit sequence or each length of a previous same-bit sequence ended by a number of different bits. In this manner, a probability table specific to each particular compression category may be generated/populated for use with performance of one of either arithmetic encoding or decoding on a data set in the particular compression category.

Description

Figure 1:
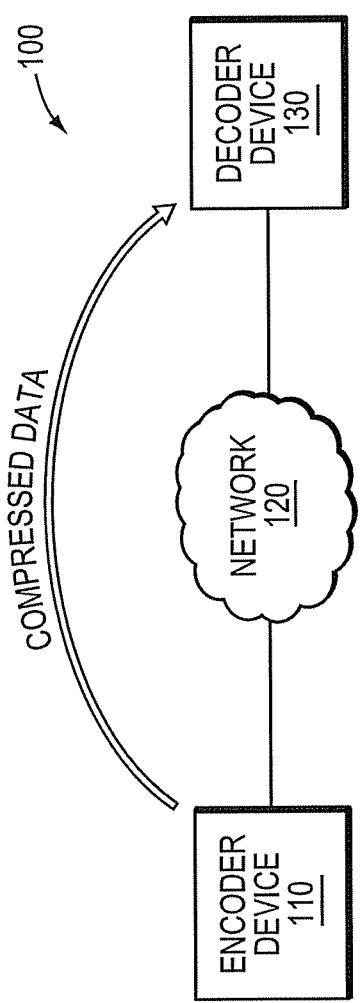
FIG. 1 illustrates an example computer network.

FIG. 1 is a schematic block diagram of an example computer network 100 illustratively comprising nodes/devices, such as an encoder device 110 and a decoder device 130 interconnected by links/network 120 as shown. For instance, the encoder/decoder devices, as described below, may be a personal computer (PC) or other type of computing device, as will be understood by those skilled in the art. Those skilled in the art will also understand that any number of nodes, devices, links, etc. may be used in the computer network, and that the view shown herein is for simplicity. Further, while the encoder device 110 and decoder device 130 are shown as separate devices configured to transmit and receive data with each other, a single encoding and decoding device (not shown) may also be used in accordance with the teachings described herein (e.g., where data is encoded and decoded by the same device, such as for compressed storage).

Illustratively, in this environment, the encoder device 110 may transmit encoded data through network 120 to the decoder device 130, such as transmitting compressed data, images, video, etc., to alleviate bandwidth and processing resources within the network 120. For example, a number of participants may interact in an on-line, interactive, or collaborative setting. Such a setting can be for a meeting, training or education, support, or any other event that may require a number of participants to work together, interact, collaborate, or otherwise participate, such as web conferences, on-line meetings, etc. As used herein, the phrase "collaborative computing session" may be used to describe these settings/events, particularly where a number of participant computers/devices collaborate in an established session, as may be appreciated by those skilled in the art. Accordingly, various types of data may be transmitted from a host device to one or more attendee/receiving devices, and thus such data may consume more resources in the network 120 as the number of receiving devices increases.

Network 120 may comprise or be supported by one or more suitable communication networks, such as, for example, a telecommunications network that allows communication via one or more telecommunications lines/channels. In particular, the communication or data networks, such as the Internet, may be used to deliver content, such as data (compressed/encoded) or other communications (e.g., transmitting probability tables, described below). The Internet is an interconnection of computer clients and servers located throughout the world and exchanging information according to Transmission Control Protocol/Internet Protocol (TCP/IP), Internetwork Packet eXchange/Sequence Packet eXchange (IPX/SPX), AppleTalk, or other suitable protocol.

Figure 2:
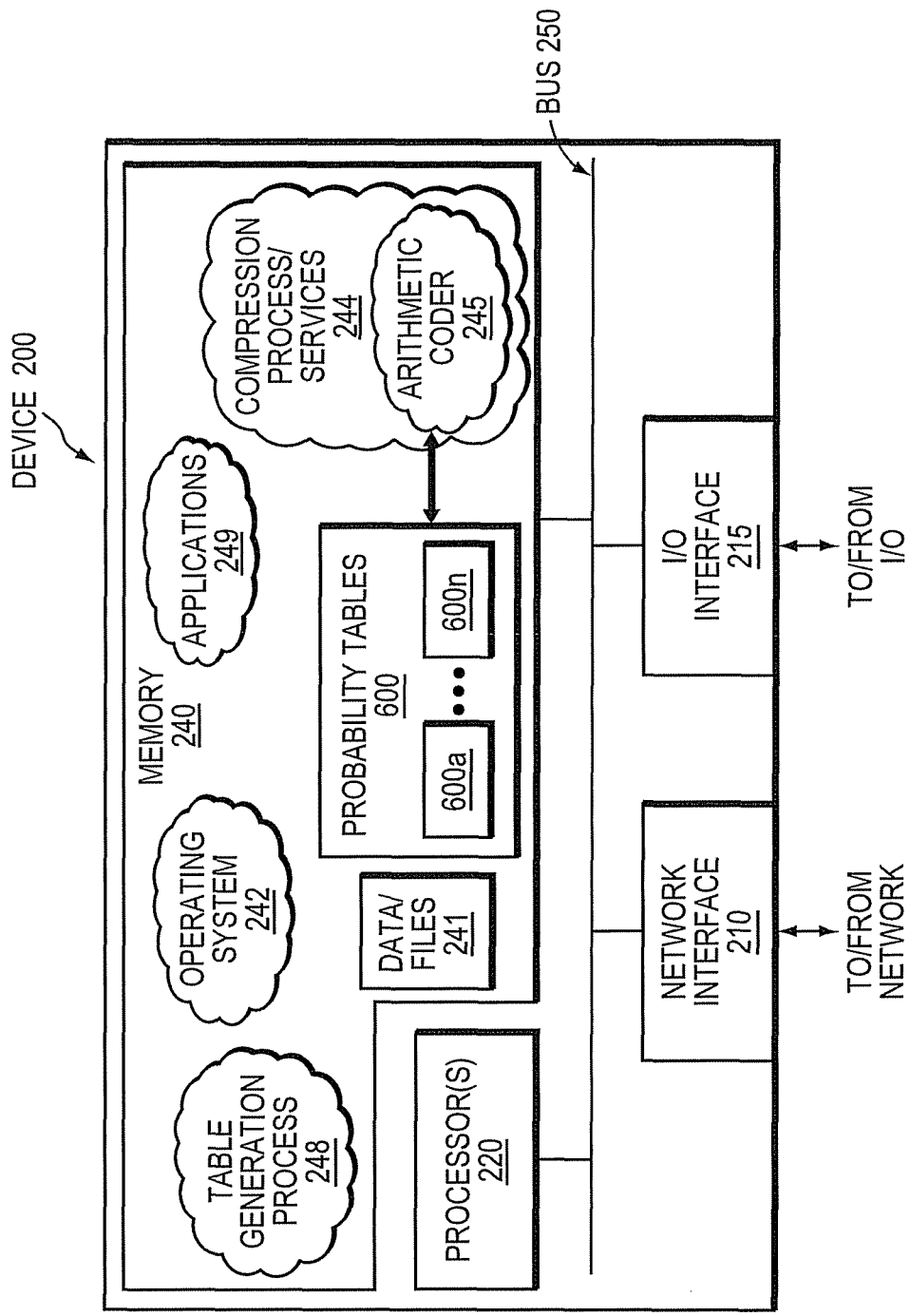
FIG. 2 illustrates an example device.

FIG. 2 illustrates a schematic block diagram of an example participant 200 that may be advantageously used with one or more embodiments described herein, e.g., an encoder device 110 or a decoder device 130. Illustratively, device 200 may be implemented or incorporated in any suitable computer such as, for example, a personal computer (PC), laptop, workstation, personal digital assistant (PDA), smart phone, mainframe, file server, workstation, or other suitable data processing facility supported by storage (either internal, e.g., electronic memory, or external, e.g., magnetic/optical disk), and operating under the control of any suitable operating system (OS).

In particular, the device 200 comprises one or more network interfaces 210, one or more input/output (I/O) interfaces 215, one or more processors 220, and a memory 240 interconnected by a system bus 250. The network interfaces 210 contain the mechanical, electrical, and signaling circuitry for communicating data over physical/wireless links coupled to the network 110. The network interface(s) may be configured to transmit and/or receive data using a variety of different communication protocols suitable for the network. Also, I/O interfaces 215 contain the mechanical, electrical, and signaling circuitry for communicating with one or more user interface devices, such as a mouse, keyboard, monitor/screen, etc. (not explicitly shown).

The memory 240 comprises a plurality of storage locations that are addressable by the processor(s) 220 and the network interfaces 210 for storing software programs associated with the embodiments described herein. The processor(s) 220 may comprise necessary elements or logic adapted to execute the software programs and manipulate the data structures, such as various data/files 241 and one or more probability tables 600a-n as described herein. An operating system 242, portions of which are typically resident in memory 240 and executed by the processor(s), functionally organizes the device by, inter alia, invoking operations in support of software processes and/or services executing on the device (e.g., for data compression as described herein). In particular, these software processes and/or services may comprise one or more known applications 249 (e.g., word processors, image viewers, web browsers, etc.), and, in particular, a compression process/service 244, illustratively housing an arithmetic coder/decoder 245, and optionally a probability table generation process 248. It will be apparent to those skilled in the art that other types of processors and memory, including various computer-readable media, may be used to store and execute program instructions pertaining to the inventive technique described herein. Also, various processes/services described herein may be operated as instances of suitable programs running on the hardware of a device 200, as will be further appreciated by those skilled in the art.

Compression process/service 244 may contain computer executable instructions executed by each processor 220 to generally perform functions relating to compression, both as understood by those skilled in the art and as additionally (or alternatively) described herein. In particular, various data compression techniques exist, such as "lossy" coding and "lossless" coding. Lossy coding involves coding that results in the loss of information, such that there is no guarantee of perfect reconstruction of the original data. The goal of lossy compression is that changes to the original data are done in such a way that they are not objectionable or detectable. In lossless compression, all the information is retained and the data is compressed in a manner that allows for perfect reconstruction of the data.

As noted, arithmetic coding is a well-known compression technique, where an encoder (at device 110) receives an input, which includes a sequence of events (e.g., binary events), or symbols, and encodes the input sequence into a corresponding sequence of bits or bytes to compress the data (assuming, that is, that the encoded sequence is smaller than the original data). An arithmetic decoder (at device 130) may then receive or access the encoded data, and decodes the sequence of encoded data to produce the original data.

Certain arithmetic coders/decoders 245 operate according to binary arithmetic coding algorithms, which are based on performing interval-subdivision process by table-lookup operations only (as will be appreciated by those skilled in the art). Representatives of well-known table-driven coders are, e.g., the Q-coder and its variants the "QM-coder" and the "MQ-coder," as adopted by the JPEG and JPEG2000 standards (of the Joint Photographic Experts Group), respectively. Also, the Moving Pictures Experts Group (MPEG) standard "H.264" is another example of a well-known table driven coder. (Other known techniques comprise quasi-arithmetic coders, the "Z-coder," and the "ELS-coder.")

A common feature of table-driven arithmetic coders is a finite-state machine (FSM) (of arithmetic coder 245) that is employed for estimating binary symbol probabilities. In particular, by applying an input (e.g., binary "1" or "0") to a probability table 600 (or a "probability state transition table"), the arithmetic coder 245 may predict the probability that a subsequent bit (next bit) is going to be a "1" or a "0." (Those skilled in the art will understand the details of how arithmetic coding operates, along with the corresponding use of probability tables.) If the arithmetic decoder can predict the next bit correctly (i.e., a "more probable symbol" or MPS), the compression is efficient. If not (i.e., a "less probable symbol" or LPS occurs), the compression is punished.

As previously mentioned, there are well-known probability tables that target all types of data/systems and that are widely used. These "one-for-all" tables are typically based on a generic theoretical probability model, and have achieved acceptable compression ratios across the many different types of data. In other words, the probability tables currently used are static tables for all types of data to be coded. However, it is not always the case that one table is the best solution for all types of data. For instance, certain tables may have been designed mathematically based on theoretical probabilities (e.g., a Bayesian estimation), where no prior knowledge is assumed about symbol probabilities. JPEG, for example, has designed a probability table based on pictures of nature, which are typically different from images of other systems, such as computer desktop displays. This same table, however, is currently used for all systems, e.g., both nature pictures and images of a computer display.

Using Specific Probability Tables for Arithmetic Coding

According to embodiments of the disclosure, when executing data compression or decompression for a data set, a particular compression category of the data set is determined, and a corresponding probability table specific to the particular compression category of the data set is accessed. Then, one of either arithmetic coding (e.g., an encoder device) or decoding (e.g., a decoder device) may be performed on the data set based on the specific probability table.

Illustratively, one or more embodiments described herein may utilize compression process/services 244, or, more particularly, arithmetic coder/decoder process/services 245 to perform the techniques described herein. For instance, these processes (or programs, implemented in hardware or software) may generally be configured to use customized probability tables with arithmetic coding/decoding for data compression. In addition, as described below in accordance with one or more embodiments herein, these probability tables may be generated/populated by table generation process 248, such as by collecting statistical data for specific systems ("compression categories"), then based on that data, customizing corresponding tables for the arithmetic coding/decoding, accordingly.

Operationally, using specific customized probability tables is based on the premise that each compression category of data may have a unique set of probabilities or a unique probability model. A compression category, generally, is a defined identification of a data set or "system" to which a same probability table may be applied during data compression/decompression. For instance, a compression category may be a type of data, such as images, specific types of images (e.g., daytime, nighttime, etc.), text documents, computer desktop displays, slide presentations, video conferences, etc. Those skilled in the art may realize that these categories may be loosely based on applications, such as image viewers, online collaborative computing sessions (e.g., shared images of computer applications and/or shared desktop displays), etc. However, even within a particular application, further categorization may take place, such as the different types of images for use with the image viewer application. In this manner, then, a compression category may be any user/designer-defined grouping or class/type of data, for example, data that may be considered to have a similar probability model. Note that applications themselves may also define categories, such as where a particular image viewer application may define "bright" images or "dark" images as separate categories to which a unique probability table is to be applied.

Figure 3:
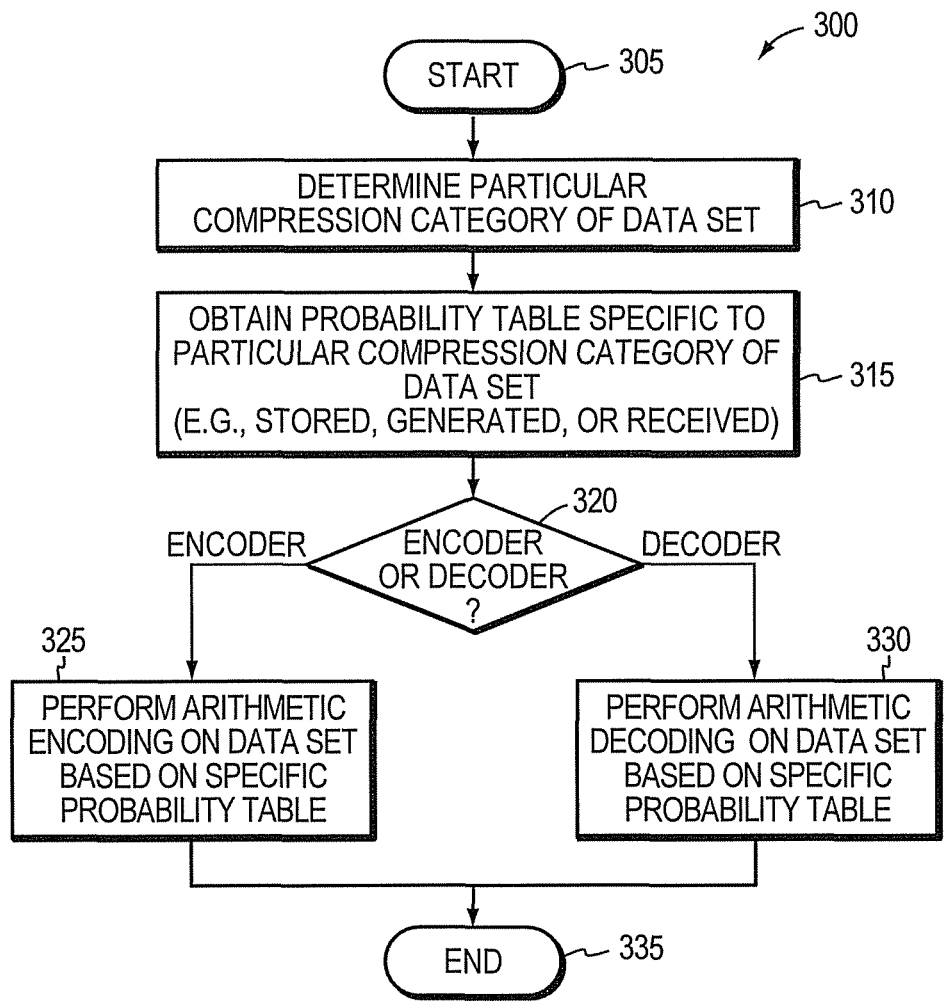
FIG. 3 illustrates an example procedure for arithmetic coding with specific probability tables.

FIG. 3 illustrates an example procedure for arithmetic coding using specific probability tables in accordance with one or more embodiments described herein. The procedure 300 starts at step 305, and continues to step 310, where a device 200, either an encoder device 110 or a decoder device 130, determines a particular compression category of a data set. For instance, as mentioned above, an associated application may identify the compression category, or the data set may have some form of identification (such as file extensions, etc.).

Once the compression category is determined, in step 315 the system accesses (obtains) an associated probability table 600 specific to the particular compression category. In one embodiment, the probability tables 600 are stored within memory 240 prior to execution of an application operating on the data set (e.g., prior to an image viewer being opened). For instance, the probability tables 600 may be a standardized table, or may otherwise be distributed between the encoder device 110 and decoder device 130. Illustratively, through execution of the associated application (e.g., an online collaboration session), the encoder device 110 may transmit the necessary probability table to be received by the decoder device 130, e.g., via the application itself. This technique is particularly useful where the encoder device 110 generates the probability table for the particular data set (e.g., where the data set is one of many similar data sets to be transmitted to the decoder device, as in continually updated desktop image sharing), as described below.

Accordingly, depending on whether the device is an encoder or decoder (step 320), arithmetic coding may be performed on the data set based on the specific probability table (that is, encoding the data in step 325, or decoding the data in step 330), and the procedure 300 ends in step 335.

Generating Specific Probability Tables for Arithmetic Coding

In addition to using specific probability tables per compression category, embodiments of the disclosure herein are directed to techniques that generate the probability tables, as well. In particular, the techniques herein provide for statistical methods to measure specific systems (data sets of particular compression categories) and to customize one probability table for the compression category. For ease of discussion, only binary arithmetic coders (which only accept bits "0" and bit "1" as the valid input) are considered, though other types of arithmetic coders may utilize the techniques herein.

As mentioned above, previous works directed toward probability estimation attempt to generate one probability table for all data sets (i.e., there are no distinct compression categories), such as based on mathematical theory. The techniques herein do not try to generate a "one-for-all" probability table, but rather utilizes the statistical methods described below to customize corresponding tables 600*a-n*.

Figure 4:
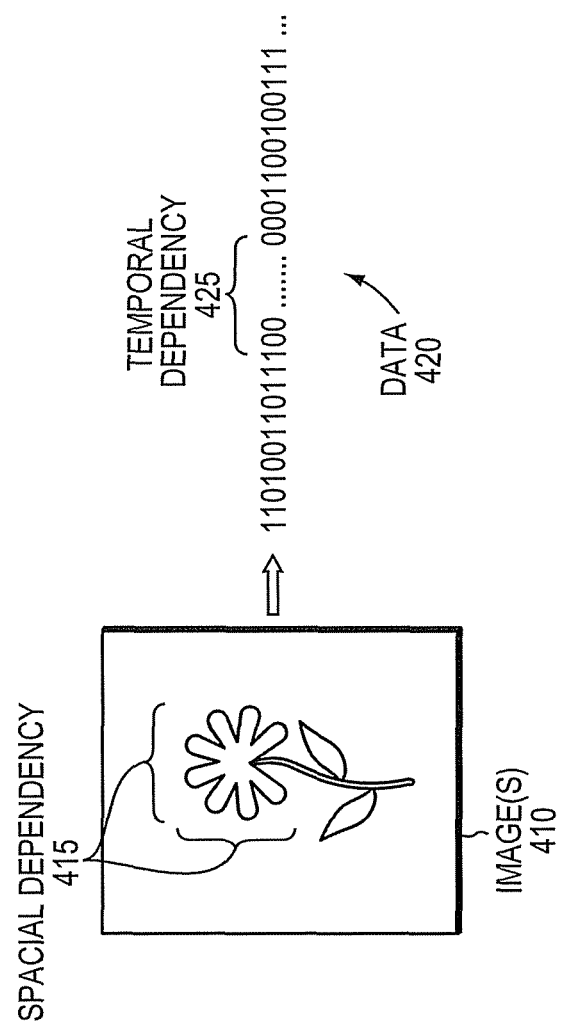
FIG. 4 illustrates an example conversion between an image and a bit stream.

Notably, compression generally attempts to take advantage of dependency among data (symbols) within a data set. There are many kinds of dependencies, such as, e.g., temporal dependency and special dependency. For example, following a sequence of 0's in a bit stream, there may be higher probability for next bit to be 0. This is an example of temporal dependency. For images, pixels one line above or below each other usually have a similar or the same color value. This is an example of spatial dependency. Briefly, FIG. 4 illustrates an example transition between an image 410 and the corresponding data/bit stream representation 420. As shown, special dependency 415 may exist between the colors of pixels found within the flower petals, while temporal dependency 425 may exist within the data 420 where a long series of 0's (or 1's) may be found.

For specific systems and data sets, it is possible that there are unknown and specific dependencies. The techniques herein, however, do not establish a probability model to find all kinds of dependencies within a data set (those skilled in the art will appreciate that it is particularly difficult to achieve this, if not impossible). Since compression algorithms are mainly designed to remove these dependencies, and arithmetic coding is usually the very last step in data compression, it can be assumed that the data passed to arithmetic coding has remaining only a temporal dependency. In fact, many compression algorithms intend to leave temporal dependency for the arithmetic coder to compress the data further based on these dependencies. Accordingly, the statistical techniques described herein focus on temporal dependency to generate a probability table, e.g., thus removing this dependency.

Figure 5A:
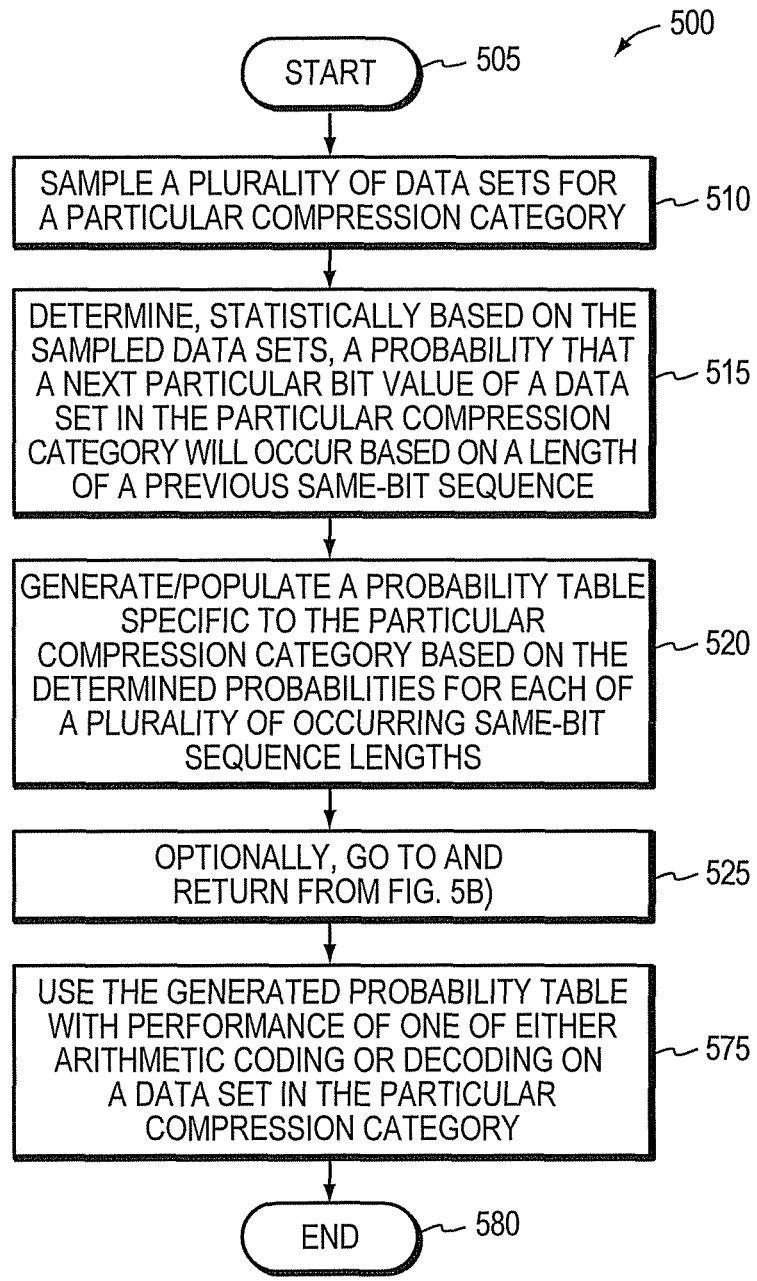
FIGS. 5A-C illustrate example procedures for generating specific probability tables.
Figure 5B:
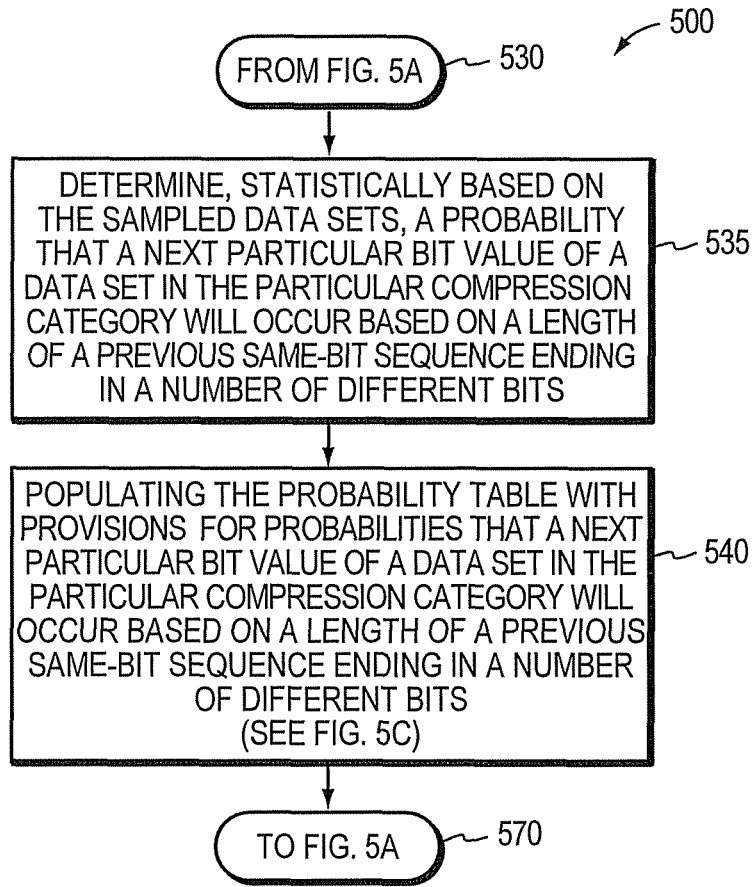
Figure 5C:
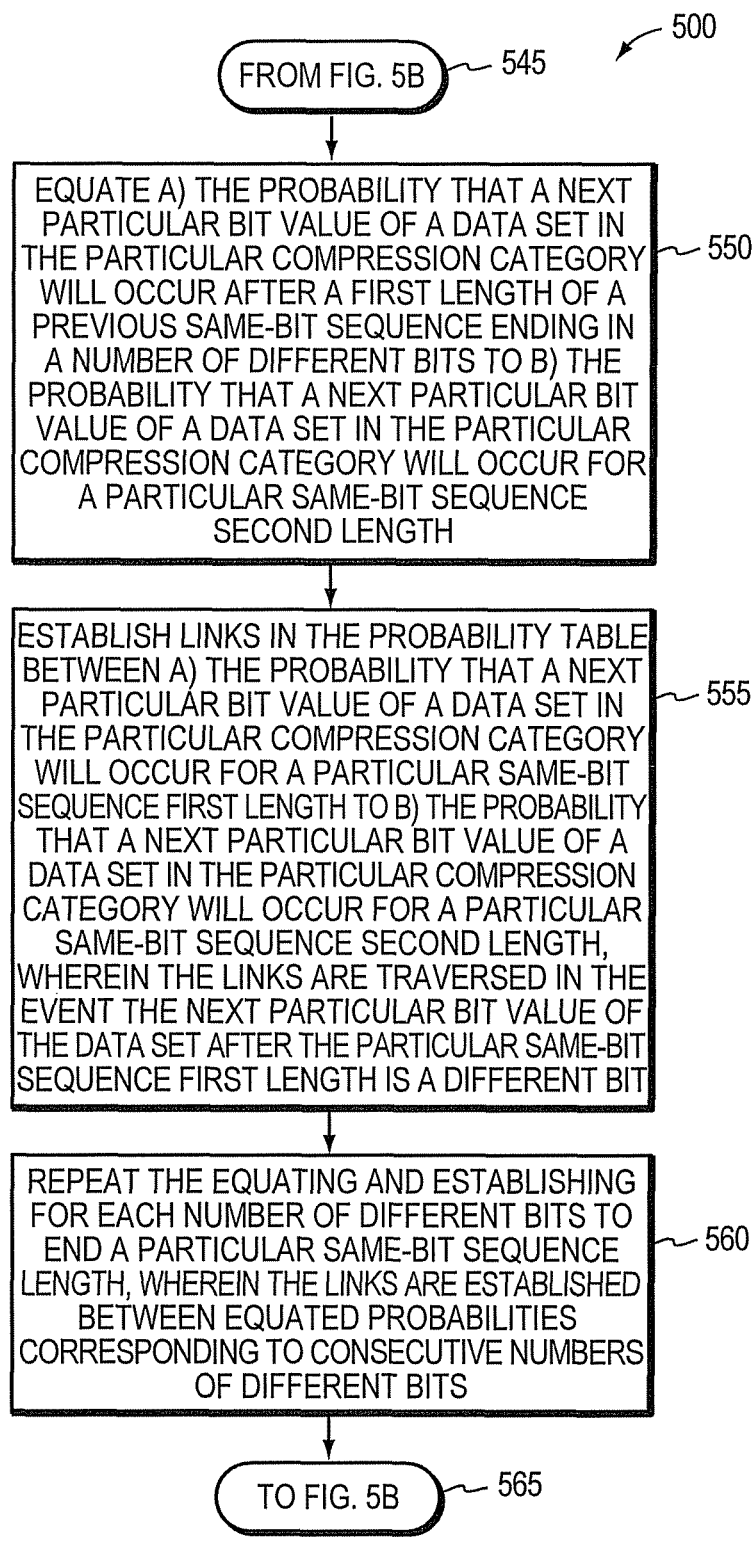

The particular techniques are described in tandem with FIGS. 5A-5C, which illustrate example procedures and sub-procedures for generating probability tables specific to particular compression categories in accordance with one or more embodiments described herein. That is, the procedure 500 starts in FIG. 5A at step 505, and continues to step 510, where the statistical generation method (e.g., performed by table generation process 248 of an encoder device or other device) samples a plurality of data sets for a particular compression category. With enough samples (e.g., one hundred), the system can collect following data:

a1[n]: the number of sequences of 0's with exact length n; and b1[n]: the number of sequences of 1's with exact length n.

For example, assume simplistically (for example only) that three data sets are sampled, each being sixteen-bits long:
1) 0100110001110111
2) 1101011000011100
3) 0001011001101010

From these random sampled data sets, it can be seen in Table 1 that the following values for a1[n] and b1[n] may be collected:

TABLE 1

| Sequence | Occurrences | Sequence | Occurrences |
|---|---|---|---|
| a1[1]: 0 | 8 | b1[1]: 1 | 5 |
| a1[2]: 00 | 3 | b1[2]: 11 | 5 |
| a1[3]: 000 | 2 | b1[3]: 111 | 3 |
| a1[4]: 0000 | 1 | | |

From this information, the probability can be determined, statistically based on the sampled data sets, that a next particular bit value of a data set in the particular compression category will occur based on a length of a previous same-bit sequence (step 515). In other words, simply counting these two points of information (a1[n] and b1[n]) sets up the probability calculation: given a preceding bit string, what is the probability that a particular next bit will occur? (Notably, this is at least in part based on the fact that since the count is the exact length, it is known that the occurrence of an exact length "000" implies "10001.")

For instance, let A1[n] be the sum of all a1[n] values with an index ranging from n to infinity (constrained by the highest value of n, "n-max"), that is A1[n]=a1[n]+a1[n+1]+a1[n+2]+ .... Or, said differently:

$$A1[n] = \sum_{n}^{n-max} a1[n] \qquad \text{Eq. 1}$$

Similarly, let B1[n] be the sum of all b1[n] values with an index ranging from n to infinity ("n-max"), or:

$$B1[n] = \sum_{n}^{n-max} b1[n] \qquad \text{Eq. 2}$$

Using the values given above in Table 1, therefore, the result of each of these equations results in the values shown in Table 2:

TABLE 2

| A1[n] | Value (a1[n] + a1[n + 1] ...) | B1[n] | Value (b1[n] + b1[n + 1] ...) |
|---|---|---|---|
| A1[1] | 8 + 3 + 2 + 1 = 14 | B1[1] | 5 + 5 + 3 = 13 |
| A1[2] | 3 + 2 + 1 = 6 | B1[2] | 5 + 3 = 8 |
| A1[3] | 2 + 1 = 3 | B1[3] | 3 = 3 |
| A1[4] | 1 = 1 | | |

Now, let PA1[n] be equal to a1[n]/A1[n]. Because A1[n] is the total number of sequences of 0's with at least length n and a1[n] is the number of sequences of 0's with exact length n, PA1[n] is thus the probability of encountering a bit 1 after a sequence of n bit 0's. Using the same logic, PB[n] is equal to b1[n]/B1[n], which is the probability of encountering a bit 0 after a sequence of n bit 1's.

Accordingly, from the equations:

$$PA1[n] = a1[n]/A1[n] \qquad \text{Eq. 3}$$

$$PB1[n] = b1[n]/B1[n] \qquad \text{Eq. 4}$$

the technique arrives at Table 3:

TABLE 3

| PA1[n] | Value (a1[n]/A1[n]) | PB1[n] | Value (b1[n]/B1[n]) |
|---|---|---|---|
| PA1[1] | 8/14 = 0.571 | PB1[1] | 5/13 = 0.385 |
| PA1[2] | 3/6 = 0.500 | PB1[2] | 5/8 = 0.625 |
| PA1[3] | 2/3 = 0.667 | PB1[3] | 3/3 = 1.000 |
| PA1[4] | 1/1 = 1.000 | | |

Having established values for PA1[n] and PB1[n], a probability model is created to determine what is the probability of a particular next bit's occurrence. For example, upon encountering a sequence of three 0's, PA1[3] indicates that the probability that the next bit is a 1 is 0.667 or a 67% chance. Notably, those skilled in the art will understand that PA1[n] and PB1[n] are similar to the value "Qe" that indicates the probability of a next bit, i.e., resulting in a "more probable symbol" (MPS) or "less probable symbol" (LPS) (where Qe generally refers to the probability of the LPS, thus in the example above, Qe would be 0.333 that the LPS bit 0 would be encountered after a string of three 0's, rather than the 0.667 probability of a bit 1, the MPS). Moreover, those skilled in the art will appreciate that the values and probabilities (and the sample data sets) are merely used herein for illustrative purposes, and need not mimic real world data/statistics.

Using the values generated above for PA1[n] and PB1[n], probability table specific to the particular compression category may be generated/populated (step 520) based on the determined probabilities for each of a plurality of occurring same-bit sequence lengths. In other words, from the sampled data sets of the compression category, it is possible to statistically create probability tables that may be more efficient for data sets of that compression category. For example, to determine a best probability table for JPEG images, a sample set (e.g., one hundred) of pictures may be used to gather statistical data and correspondingly generate a probability table 600, which may be used to compress (and decompress) all JPEG images. Conversely, for all screen shot images (e.g., images transmitted when sharing a desktop display of a computer or one or more applications), then another probability table 600 may be created in a similar manner using data sets from similar screen shots (e.g., screen shots in general, screen shots of a word processing program, screen shots of a slide presentation program, etc.) and the associated probabilities statistically determined.

FIG. 6A is an illustrative probability table 600 that may be generated in accordance with one or more embodiments described herein. For instance, the table 600 may have one or more entries 605 containing fields corresponding to an index 610, a bit and length field 615, a probability value 620 that the next bit is different, a "same jump" field 625 indicating the index 610 to move to in the event the same bit is again encountered, and a "different jump" field 630 indicating the index 610 to move to in the event a different bit is encountered after the length of same bits.

(Those skilled in the art will appreciate that table 600 is merely for illustrative purposes, and is not meant to limit the scope of the embodiments described herein. For instance, the format and population of the table 600 may differ from that shown, while having the same purpose and ability as a table generated using statistical probabilities as described herein. For example, while probability values 620, same-bit jumps 625, and different-bit jumps 630 are shown and described, those skilled in the art may appreciate that Qe values, Next MPS (NMPS), Next LPS (NLPS), and MPS switch/swap fields may instead be used. Also, the index 610 in conventional terms may generally refer to "renormalization," while here they are for each successive same-bit length increase. In other words, the view shown in FIGS. 6A (and 6B) are merely used to simplify the discussion of table generation/population, and those skilled in the art will understand the format and construction of tables that may be used in current or future compression processes.)

As a brief example, assume that the arithmetic coder 245 has detected three bit 0's, and is thus at index "3" (field 610). The corresponding probability that the next bit is different is 0.667 (field 620, e.g., for PA1[3]), and if another 0 is encountered, the coder jumps to index "4" (field 625). Otherwise, if a 1 is encountered, the coder jumps to index "129" (field 630), which is the first field of sequences of bits 1 (e.g., for PB1[n]). ("X" values denote instances that are not expected to happen. Those skilled in the art will appreciate that although statistically based on the sample data sets that these situations may not have occurred, real world tables may generally allow certain tolerances, such as equating "1.000" probability with "0.999", and replacing "X" values with incrementing indexes (field 625), or the first different-bit index (e.g., "129" in field 630). Also, the indexes are limited to 128-bit length same-bits sequences, though any limiting number may be used.)

Notably, the above-described probability model generally only considers the nearest continuous bit sequence as context to predict a next bit. However, it may often be the case that after a substantially long sequence of a same bit (e.g., many 0's) ending in a different bit (e.g., a single or few 1's), the probability is not necessarily equal to the probability for the sequence of the different bit(s) (the 1's). That is, according to the model above, the probability for the next bit to be a 1 is 1-PB1[1] or 0.615 (or, more generally with real world data set statistics, closer to 0.500). This probability may not be a completely accurate estimation, since in many situations, a long sequence of a same bit may simply be divided by dispersed occurrences of singular or few different bits (for example, a sequence of 00 . . . 00100 . . . 00). By using only one bit as a context to predict probability for a next bit, the above algorithm ignores certain practical statistical occurrences. As such, an extended model may be used to predict more accurately.

According to one or more embodiments described herein, therefore, an enhanced probability model may be generated (from step 525 of FIG. 5A to step 530 of FIG. 5B) in step 535 by determining, statistically based on the sampled data sets, a probability that a next particular bit value of a data set in the particular compression category will occur based on a length of a previous same-bit sequence ending in a number of different bits.

In other words, the following information may be determined based on the sampled data sets in a similar manner to that described above:

PA2[n]: the probability of a next bit being a 1 after a sequence of n bit 0's and one bit 1; and PB2[n]: the probability of a next bit being a 0 after a sequence of n bit 1's and one bit 0.

From these values, the probability tables may be populated (in step 540) with provisions for the probabilities that a next particular bit value of a data set in the particular compression category will occur based on a length of a previous same-bit sequence ending in a number of different bits. That is, for each length n of a same-bit sequence that is followed by a different bit value (e.g., a single different bit value), the probability may be determined that the next bit is the same bit (as the rest of the same-bit sequence).

An example provision for these extended probabilities comprises the linking (jumping) between probability values of the probability tables. For instance, according to the values for PA2[n] (and similarly for PB2[n]), after a sequence of n bit 0's and one bit 1, a value "k" may be determined such that the difference between PA2[n] and PA1[k] is minimized (i.e., the values are closest together). Specifically, probability PA1[k] may be used instead of 1-PB1[1] to predict the next bit to be a 1, since the actual probability that a 1 will occur is more closely based on the preceding long sequence of 0's, rather than the single bit 1. Note that the equivalence relationship is established between a) n bit 0's and one bit 1 and b) k bit 0's since the probability tables do not generally store PA2 values. As such, the equivalence is used to point to an appropriate PA1 probability value in the table.

In other words, as stated in FIG. 5C at step 550 (e.g., included within step 545 from FIG. 5B), the table generation process (248) may equate a) the probability that a next particular bit value of a data set in the particular compression category will occur after a first length of a previous same-bit sequence ending in a number of different bits to b) the probability that a next particular bit value of a data set in the particular compression category will occur for a particular same-bit sequence second length. For example, the probability of encountering a 1 after one hundred 0's followed by a single 1 may be roughly equal to the probability of encountering a 1 after fifty 0's, and not the same as encountering a 1 after a single 1.

FIG. 6B is an illustrative probability table 600-2 that may be generated in accordance with one or more embodiments described herein, particularly, the extended probability model described above. Table 600-2 may have substantially the same format as table 600 of FIG. 6A, however the values of the entries 605 may now be changes. (Again, those skilled in the art will appreciate that table 600-2 is merely for illustrative purposes, and is not meant to limit the scope of the embodiments described herein. Other formats and population of the table 600-2 may differ from that shown, while having the same purpose and ability as a table generated using statistical probabilities as described herein.)

For example, probabilities in field 620 have been replaced with their variable indicators (e.g., "PA1[1]"), and different entries are displayed (e.g., indexes 50 and 100). While the same-bit jump field 625 may be generally populated in a similar manner to the basic probability model above (e.g., incrementing the index value as each same bit is encountered), according to this extended aspect of the embodiments herein, different-bit jump field 630 may be adjusted accordingly. For instance, as noted above, if after reaching one hundred 0's (index 100) a single bit 1 is encountered, then the different-bit field 630 indicates a jump not to the first index entry for a single bit 1 as above in the basic model, but instead indicates the index of PA1[k] as described, e.g., "50" for PA1[50], assuming that the probabilities of PA2[100] is substantially similar to PA1[50]. Smaller sequence lengths, however, may still jump to the single different bit index (e.g., "129"), as mentioned above.

In particular (in step 555), these links (jumps) may be established in the probability table between a) the probability that a next particular bit value of a data set in the particular compression category will occur for a particular same-bit sequence first length to b) the probability that a next particular bit value of a data set in the particular compression category will occur for a particular same-bit sequence second length, wherein the links are traversed in the event the next particular bit value of the data set after the particular same-bit sequence first length is a different bit.

As another explanation, in the basic probability model of FIG. 6A, regardless of the number of 0's encountered, as soon as a 1 was met, the table jumps to the probability based on a single 1 (e.g., PB1[1]). In the extended model of FIG. 6B, however, assuming an example one hundred 0's have been encountered, if a single 1 is met, the table jumps to the probability based on another example 50 0's (e.g., PA1[50]). In this manner, more precise probabilities may be developed where real-world statistics create such situations, and where the dependency relies not only on a sequence of same-bit values, but on a previous history of same-bit values at great lengths. (Notably, that is, smaller lengths for PA2[n] may not result in any efficiencies over using PB1[n], since the effect on the probability at small same-bit lengths is negligible; e.g., PA2[n] may be the same probability as PA1[n], and no equivalence ([k]) is needed.)

Depending upon system configuration and statistical effectiveness, it may be possible to repeat the equating and establishing (step 560) for each number of different bits to end a particular same-bit sequence length. For example, after one hundred 0's and single 1, the probability may be PA2[100] or PA1[50], as described above. After encountering another 1 (one hundred 0's and two 1's), then the process may be extended to find another equivalence link between PA1[50] and PA1[k2] (e.g., PA1[15]). In other words, if a sequence of n bit 0's and two bit 1's occurs, then two steps may be taken: first, find k1 to minimize the difference between PA1[k1] and PA2[n]; and second, find k2 to minimize the difference between PA1[k2] and PA2[k1]. This may be extended repeatedly to more bit 1's (more different bits) after a sequence of n bit 0's until the efficiency gains are negligible (that is, where the probability equates roughly to the probability using the different bits as the same-bit sequence, e.g., using PB1[n] instead) or to a predefined limit of different bits.

As shown in FIGS. 5A-5C, the procedure 500 returns from optional sub-procedure of FIG. 5C to the extended sub-procedure of FIG. 5B in step 565, then to the primary procedure of FIG. 5A in step 570. At this point, in step 575 the generated probability tables may then be used during the performance of one of either arithmetic encoding or decoding on a data set in the particular compression category as will be appreciated by those skilled in the art, and the procedure 500 ends in step 580.

Advantageously, the novel techniques described herein generate and use customized probability tables for arithmetic coding of specific compression categories during data compression. By providing specific probability tables per compression category, the novel techniques allow for more precise compression and better performance based on corresponding tables, rather than on a single generic table as conventionally used in the art. In particular, the embodiments described above detail a simple and enhanced technique that may be used to generate/populate the probability tables for each compression category based on statistical data for the compression category, rather than on generic mathematical theory.

While there have been shown and described illustrative embodiments that generate and use customized probability tables for arithmetic coding of specific applications/systems during data compression, it is to be understood that various other adaptations and modifications may be made within the spirit and scope of the present invention. For example, the embodiments have been shown and described herein with relation to particular compression techniques and standards. However, the embodiments of the invention in their broader sense are not so limited, and may, in fact, be used with other compression techniques understood by those skilled in the art to utilize a probability table in a similar manner. Also, while the techniques described above suggest utilizing a different probability table for each compression category, certain categories (e.g., from one to all) may share a probability table in common. In particular, when all applications belong to a single compression category (or when all compression categories use the same probability table), the corresponding table generated by the statistical techniques described above (e.g., sampling, determining, and populating) may still be used. For example, a single generic probability table statistically generated based on the above probability model may be used in arithmetic decoders with an improvement over the conventional generic probability table used in compression (e.g., a 5% increase in compression).

Moreover, other types of arithmetic coding may be adapted to utilize the teachings described herein. For instance, the techniques may be modified to be used in adaptive arithmetic coding, where the probability model varies according to a recent bit stream. In other words accessing a specific probability table may actually comprise adaptively generating the specific probability table during execution of an application at an encoder device, and subsequently transmitting the specific probability table from the encoder device to a decoder device, e.g., during execution of the application at the decoder device.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   determining a particular compression category of a data set, wherein the compression category is determined according to a type of data contained in the data set and content contained within the data set;
   generating specific probability tables for each particular compression category of a plurality of compression categories;
   accessing a specific probability table according to the determination of the particular compression category of the data set; and
   performing, by a computer, one of either arithmetic encoding or decoding on the data set based on the specific probability table,
   wherein the compression category is selected from a group consisting of: a computer desktop display; a slide presentation application; a particular type of image; an application- defined category; and a video conference.

2. The method as in claim 1, further comprising:
   storing the probability table for the compression category prior to executing an application to operate on the data set.

3. The method as in claim 1, further comprising:
   executing an application to operate on the data set; and
   receiving the specific probability table through the application.

4. The method as in claim 1, further comprising:
transmitting the specific probability table from an encoder device to a decoder device.

5. The method as in claim 1, further comprising:
executing an application to operate on the data set, wherein the application is an image viewer.

6. The method as in claim 1, further comprising:
executing an application to operate on the data set, wherein the application is an online collaborative computing session.

7. The method as in claim 1, wherein accessing comprises:
adaptively generating the specific probability table during execution of an application to operate on the data set at an encoder device; and
transmitting the specific probability table from the encoder device to a decoder device during execution of the application at the decoder device.

8. The method as in claim 1, wherein encoding and decoding are performed in accordance with one of either a Joint Photographic Experts Group (JPEG) standard or a Moving Pictures Experts Group (MPEG) standard.

9. The method as in claim 1, wherein generating comprises:
sampling a plurality of data sets for a particular compression category;
determining, statistically based on the sampled data sets, a probability that a next particular bit value of a data set in the particular compression category will occur based on a length of a previous same-bit sequence; and
populating a probability table specific to the particular compression category based on the determined probabilities that a next particular bit value of a data set in the particular compression category will occur for each of a plurality of occurring same-bit sequence lengths.

10. The method as in claim 9, wherein the data sets substantially have only temporal dependencies.

11. The method as in claim 9, further comprising:
determining, statistically based on the sampled data sets, a probability that a next particular bit value of a data set in the particular compression category will occur based on a length of a previous same-bit sequence ending in a number of different bits; and
wherein populating the probability table comprises provisions for probabilities that a next particular bit value of a data set in the particular compression category will occur based on a length of a previous same-bit sequence ending in a number of different bits.

12. The method as in claim 11, wherein the provisions comprise:
equating a) the probability that a next particular bit value of a data set in the particular compression category will occur after a first length of a previous same-bit sequence ending in a number of different bits to b) the probability that a next particular bit value of a data set in the particular compression category will occur for a particular same-bit sequence second length; and
establishing links in the probability table between a) the probability that a next particular bit value of a data set in the particular compression category will occur for a particular same-bit sequence first length to b) the probability that a next particular bit value of a data set in the particular compression category will occur for a particular same-bit sequence second length, wherein the links are traversed in the event the next particular bit value of the data set after the particular same-bit sequence first length is a different bit.

13. The method as in claim 9, wherein all data sets belong to a single compression category, and wherein a single probability table that is generated by sampling, determining, and populating is used for all data sets.

14. A method, comprising:
sampling, by a computer, a plurality of data sets for a particular compression category, wherein the compression category is indicative of a type of data contained in the data sets and content contained within each data set;
determining, statistically based on the sampled data sets, a probability that a next particular bit value of a data set in the particular compression category will occur based on a length of a previous same-bit sequence; and
generating, by the computer, a probability table specific to the particular compression category based on the determined probabilities that a next particular bit value of a data set in the particular compression category will occur for each of a plurality of occurring same-bit sequence lengths, wherein the generated probability table is configured for use with performance of one of either arithmetic encoding or decoding on a data set in the particular compression category,
wherein the compression category is selected from a group consisting of: a computer desktop display; a slide presentation application; a particular type of image; an application-defined category; and a video conference.

15. The method as in claim 14, further comprising:
determining, statistically based on the sampled data sets, a probability that a next particular bit value of a data set in the particular compression category will occur based on a length of a previous same-bit sequence ending in a number of different bits; and
wherein populating the probability table comprises provisions for probabilities that a next particular bit value of a data set in the particular compression category will occur based on a length of a previous same-bit sequence ending in a number of different bits.

16. The method as in claim 15, wherein the provisions comprise:
equating a) the probability that a next particular bit value of a data set in the particular compression category will occur after a first length of a previous same-bit sequence ending in a number of different bits to b) the probability that a next particular bit value of a data set in the particular compression category will occur for a particular same-bit sequence second length; and
establishing links in the probability table between a) the probability that a next particular bit value of a data set in the particular compression category will occur for a particular same-bit sequence first length to b) the probability that a next particular bit value of a data set in the particular compression category will occur for a particular same-bit sequence second length, wherein the links are traversed in the event the next particular bit value of the data set after the particular same-bit sequence first length is a different bit.

17. The method as in claim 16, further comprising:
repeating the equating and the establishing for each number of different bits to end a particular same-bit sequence length, wherein the links are established between equated probabilities corresponding to consecutive numbers of different bits.

18. A non-transitory tangible computer-readable media having software encoded thereon, the software when executed operable to:
determine a particular compression category of a data set, wherein the compression category is determined according to a type of data contained in the data set and content contained within the data set;

access a probability table specific to the particular compression category of the data set; and perform one of either arithmetic encoding or decoding on the data set based on the specific probability table, wherein the compression category is selected from a group consisting of: a computer desktop display; a slide presentation application; a particular type of image; an application-defined category; and a video conference.

19. An apparatus, comprising:

a processor adapted to execute one or more processes; and a memory configured to store a compression process executable by the processor, the compression process when executed operable to:

determine a particular compression category of a data set, wherein the compression category is determined according to a type of data contained in the data set and content contained within the data set;

access a specific probability table according to the determination of the particular compression category of the data set; and perform one of either arithmetic encoding or decoding on the data set based on the specific probability table, wherein the compression category is selected from a group consisting of: a computer desktop display; a slide presentation application; a particular type of image; an application-defined category; and a video conference.

20. The apparatus as in claim 19, wherein the compression process when executed is further operable to:

generate specific probability tables for each particular compression category of a plurality of compression categories, wherein the compression process is configured to:

sample a plurality of data sets for a particular compression category, wherein the compression category is indicative of a set of probabilities;

determine, statistically based on the sampled data sets, a probability that a next particular bit value of a data set in the particular compression category will occur based on a length of a previous same-bit sequence; and populate a probability table specific to the particular compression category based on the determined probabilities that a next particular bit value of a data set in the particular compression category will occur for each of a plurality of occurring same-bit sequence lengths.

21. The apparatus as in claim 19, wherein the compression process when executed is further operable to transmit the specific probability table to another device.

22. The apparatus as in claim 19, wherein the compression process when executed is further operable to receive the specific probability table from another device.

* * * * *